(12) United States Patent
Caterino et al.

(10) Patent No.: US 9,530,264 B2
(45) Date of Patent: Dec. 27, 2016

(54) USING LOW POWER RADIO TO CONTROL A HIGHER POWER COMMUNICATION INTERFACE

(71) Applicant: ASSA ABLOY INC., New Haven, CT (US)

(72) Inventors: Mark A. Caterino, Prospect, CT (US);
Tiffany Mayo, Prospect, CT (US);
Kevin Kraus, Monument, CO (US);
Jason Williams, Atlanta, GA (US);
Garrett Lovejoy, Madison, CT (US)

(73) Assignee: ASSA ABLOY INC., New Haven, CT (US)

( * ) Notice: Subject to any disclaimer, the term of this patent is extended or adjusted under 35 U.S.C. 154(b) by 0 days.

(21) Appl. No.: 14/966,892

(22) Filed: Dec. 11, 2015

(65) Prior Publication Data
US 2016/0171808 A1 Jun. 16, 2016

Related U.S. Application Data

(60) Provisional application No. 62/091,935, filed on Dec. 15, 2014.

(51) Int. Cl.
*G07C 9/00* (2006.01)
(52) U.S. Cl.
CPC ....... *G07C 9/00309* (2013.01); *G07C 9/00007* (2013.01); *G07C 2009/00769* (2013.01)
(58) Field of Classification Search
CPC ................. G07C 9/00309; G07C 2009/00769; G07C 9/00007; G07C 9/00111; G07C 9/00571; G07C 2009/00793; G07C 2209/63

(Continued)

(56) References Cited

U.S. PATENT DOCUMENTS

| 7,388,467 B2 * | 6/2008 | Fisher | E05B 47/02 307/10.1 |
| 7,515,033 B2 * | 4/2009 | Roosli | E05B 47/00 340/5.6 |

(Continued)

*Primary Examiner* — Mark Blouin
(74) *Attorney, Agent, or Firm* — DeLio, Peterson & Curcio, LLC; David R. Pegnataro

(57) ABSTRACT

An integrated access control system for wirelessly managing an access point comprises a wirelessly operable electronic door lock coupled to the access point, a computing device controlled and operated by a first user, and a multi-radio host device located at or adjacent to the access point, the host device being in communication with the electronic door lock and the computing device. Each of the computing device and the host device comprises a memory configured to store instructions to enable the device to wirelessly communicate with the electronic door lock and the other device, a processor configured to execute the instructions, a low power wireless communication radio, and a high power wireless communication radio, wherein the host device and computing device are selectively capable of bidirectional communication via each of a low power radio communication channel and a high power radio communication channel. The host device further comprises at least one mechanism for detecting and/or capturing the presence of a second user accessing the access point, and the computing device further comprises a display and a user interface. The host device is configured to send event and/or system notifications to the computing device and receive operational and/or configuration commands from the computing device via the low power radio communication channel, and the host device is further configured to selectively operate the host device high power wireless communication radio to transmit an image and/or video captured by the host device at least one mechanism to the computing device in response to a command from the computing device via the low power radio communication channel.

26 Claims, 6 Drawing Sheets

(58) Field of Classification Search
USPC .......................................................... 340/5.61
See application file for complete search history.

(56) References Cited

U.S. PATENT DOCUMENTS

| | | |
|---|---|---|
| 8,014,329 B2 | 9/2011 | Gong |
| 8,035,479 B2 * | 10/2011 | Tran .................. G07C 9/00309 340/5.71 |
| 8,515,383 B2 | 8/2013 | Prince et al. |
| 8,761,064 B2 | 6/2014 | Soliman et al. |
| 2006/0156361 A1 | 7/2006 | Wang et al. |
| 2010/0307206 A1 | 12/2010 | Taylor et al. |
| 2011/0181412 A1 | 7/2011 | Alexander et al. |
| 2012/0147268 A1 | 6/2012 | Hassan et al. |
| 2013/0090744 A1 | 4/2013 | Tran |
| 2013/0127260 A1 | 5/2013 | Webb et al. |
| 2014/0035722 A1 * | 2/2014 | Kincaid ............. G07C 9/00111 340/5.61 |
| 2014/0098227 A1 | 4/2014 | Chen et al. |
| 2014/0365773 A1 * | 12/2014 | Gerhardt ............ G07C 9/00309 713/168 |
| 2015/0011970 A1 | 1/2015 | Kamen et al. |
| 2015/0016407 A1 | 1/2015 | Erickson et al. |

\* cited by examiner

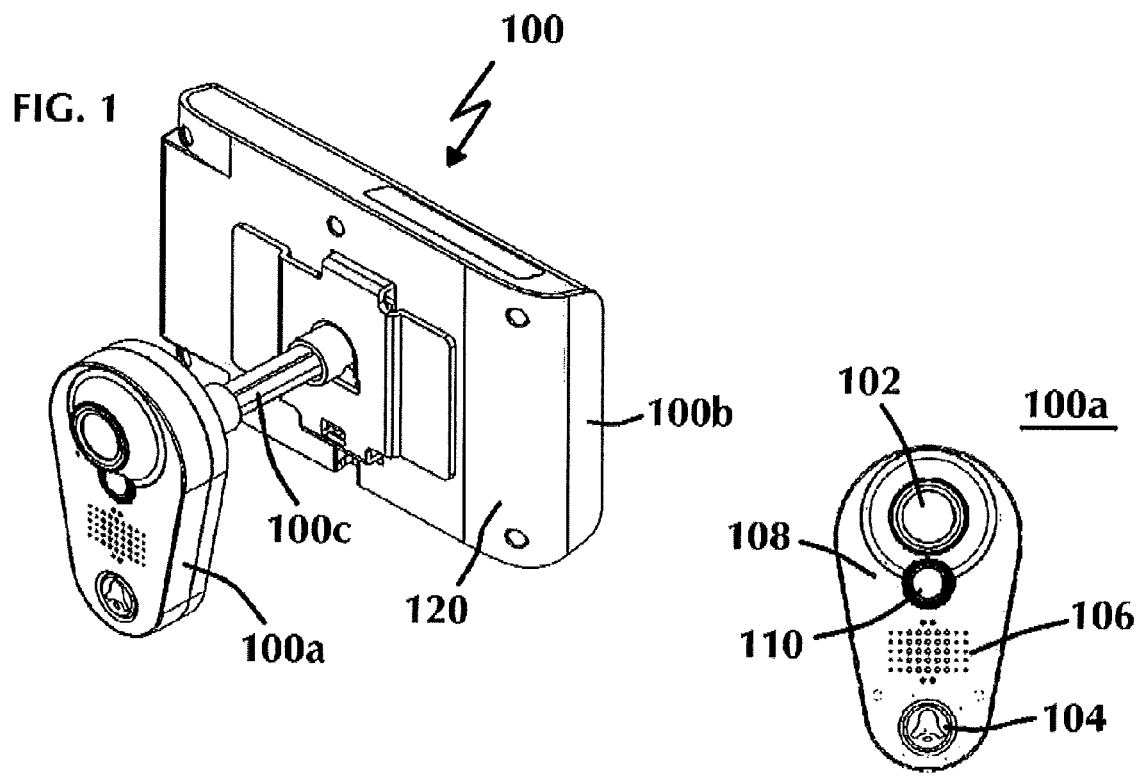
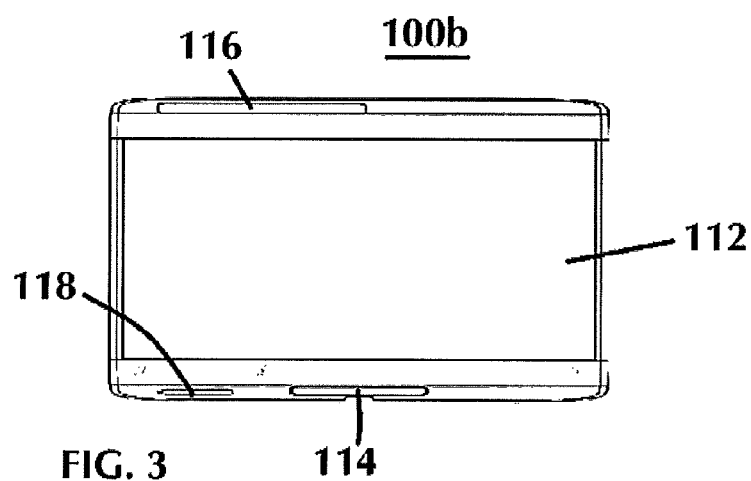
FIG. 1
FIG. 2
FIG. 3

USING LOW POWER RADIO TO CONTROL A HIGHER POWER COMMUNICATION INTERFACE

RELATED APPLICATIONS

The present invention claims priority to U.S. Provisional Patent Application No. 62/091,935, filed on Dec. 15, 2014, the entire disclosure of which is hereby incorporated by reference.

BACKGROUND OF THE INVENTION

1. Field of the Invention

The present invention relates to multi-radio devices utilizing wireless communication methods, and more particularly, to battery-operated devices selectively utilizing both low power and high power wireless communication radios to manage varying data packet communications.

2. Description of Related Art

Communication methods, whether wired or wireless, such as Wi-Fi™, are not conducive for use in battery-powered devices because of their higher power demands. When used in battery-powered devices, these communication methods are typically used in a restrictive fashion in order to conserve battery life, thus limiting their host device's functionality. The use of low power radio technologies, such as Z-wave® or Zigbee, drastically improves battery life, allowing for more product feature exposure. However, these low power radio technologies are also very bandwidth limited. They are very good for sending small-sized data packets but are not capable of handling large amounts of data, such as audio or video, efficiently. Likewise, using a higher power interface to handle small data packets is very inefficient with respect to battery life.

Therefore, a need exists for a means to utilize a low power radio technology to manage a higher power communication interface in a battery-powered multi-radio host device, which will aid in conserving battery life while managing bandwidth efficiently.

SUMMARY OF THE INVENTION

Bearing in mind the problems and deficiencies of the prior art, it is therefore an object of the present invention to provide an improved system and method for managing data packet communications in a multi-radio host device.

It is another object of the present invention to provide an improved method for conserving battery life in a multi-radio host device.

A further object of the invention is to provide an integrated access control system for wirelessly managing an access point.

It is yet another object of the present invention to provide an improved method of operating a multi-radio host device by limiting small data packet communications to a low power wireless radio communication channel, and allowing for selectively operating the high power wireless radio communication channel to transmit large data packet communications.

Still other objects and advantages of the invention will in part be obvious and will in part be apparent from the specification.

The above and other objects, which will be apparent to those skilled in the art, are achieved in the present invention which is directed, in a first aspect, to an integrated access control system for wirelessly managing an access point. The system comprises a wirelessly operable electronic door lock coupled to the access point, and a remote computing device controlled and operated by a first user. The computing device comprises a memory configured to store instructions to enable the computing device to wirelessly communicate with the electronic door lock and a multi-radio host device located at or adjacent to the access point, a processor configured to execute the instructions, a low power wireless communication radio, a high power wireless communication radio, a display and a user interface. The system further comprises a multi-radio host device located at or adjacent to the access point. The host device is in communication with the electronic door lock and the computing device, and comprises a memory configured to store instructions to enable the host device to communicate with the electronic door lock and the computing device, a processor configured to execute the instructions, a low power wireless communication radio, a high power wireless communication radio, and at least one mechanism for detecting and/or capturing the presence of a second user accessing the access point. The host device and the computing device are selectively capable of bidirectional communication via each of a low power radio communication channel and a high power radio communication channel.

The host device at least one mechanism may be an alphanumeric keypad, a proximity detector, a proximity detector with built-in alphanumeric keypad, a magnetic stripe reader, a magnetic stripe reader with built-in alphanumeric keypad, a biometric reader, a passive infrared sensor, an active infrared sensor, radio signature detection, motion detection, a light sensor, an accelerometer, a vibration sensor, a motion-on camera, a microphone, or a doorbell. The low power radio communication channel may be at least one of Bluetooth®, Z-wave® or Zigbee and the high power radio communication channel may be at least one of Wi-Fi™, 3G, 4G, or Ethernet. The computing device may be a desktop computer, a laptop computer, a tablet PC, a cellular telephone or a smartphone.

The system may further comprise a data storage, and the host device may be configured to capture an access point valid and/or invalid entry event detected by the host device at least one mechanism and store the access point valid and/or invalid entry event in the data storage.

The host device may be configured to send event and/or system notifications to the computing device and receive operational and/or configuration commands from the computing device via the low power radio communication channel. The host device may be further configured to selectively operate the host device high power wireless communication radio to transmit an image and/or video captured by the host device at least one mechanism to the computing device in response to a command from the computing device via the low power radio communication channel.

In an embodiment, the host device may be configured to send a signal via the low power radio communication channel to the computing device when the host device at least one mechanism detects the presence of a second user accessing the access point. The system may further be configured to selectively operate the host device high power wireless communication radio to transmit an image and/or video captured by the host device at least one mechanism to the computing device in response to a command from the computing device via the low power radio communication channel to capture an access point entry event.

The host device may further comprise a display and user interface and may be configured to initiate a bidirectional audio/and or video communication with the computing device via the high power radio communication channel after detecting the presence of the second user accessing the access point. In at least one embodiment, the host device may be battery-operated.

The electronic door lock may be moveable between a locked and unlocked position in response to a command received at a lock controller associated with the electronic door lock from the host device.

In another aspect, the present invention is directed to a method for wirelessly managing an access point. The method comprises first providing an integrated access control system as described above. The method further comprises detecting via the host device at least one mechanism the presence of a second user accessing the access point, and signaling by the host device the computing device via the low power radio communication channel. The first user then initiates from the computing device a bidirectional audio and/or video communication with the host device via the high power radio communication channel, and identifies the second user for authorized entry at the access point. If authorized, the first user sends a signal by the computing device to the host device via the low power radio communication channel to command the electronic door lock to enter an unlocked state to provide access to the access point to the second user.

In yet another aspect, the present invention is directed to a method for managing an access point entry event, comprising providing a wirelessly operable electronic door lock coupled to the access point, and providing a multi-radio host device located at or adjacent to the access point, the host device being in communication with the electronic door lock. The host device comprises a memory configured to store instructions to enable the host device to communicate with the electronic door lock, a processor configured to execute the instructions, a motion-on camera positioned to record a user accessing the access point, a low power wireless communication radio, and a high power wireless communication radio. The method further comprises providing a credential reader located at or adjacent to the access point for allowing access to the access point to a user, the credential reader being in communication with the electronic door lock and the host device. The method comprises detecting via the host device motion-on camera a user activating the credential reader; capturing via the host device motion-on camera a still image and/or video of an access point entry event; associating a date and time of the credential reader activation with the still image and/or video capture; and storing by the host device the still image and/or video capture in a data storage device.

In an embodiment, the credential reader may be an alphanumeric keypad, a proximity detector, a proximity detector with built-in alphanumeric keypad, a magnetic stripe reader, a magnetic stripe reader with built-in alphanumeric keypad, or a biometric reader.

The method may further comprise transmitting by the host device the still image and/or video capture via a high power radio communication channel to a computing device controlled and operated by a first user, wherein the computing device comprises a memory configured to store instructions to enable the computing device to wirelessly communicate with the electronic door lock and the host device, a processor configured to execute the instructions, a low power wireless communication radio, a high power wireless communication radio, a display and a user interface.

In still yet another aspect, the present invention is directed to a method for capturing a tampering event at an access point. The method comprises providing an electronic door lock coupled to the access point, the electronic door lock having at least one electrical component in the lock to be monitored and at least one output for connection to a multi-radio host device located remotely from the electronic door lock for monitoring load resistance between the host device and the electronic door lock, and providing a multi-radio host device located at or adjacent to the access point, the host device being in communication with the electronic door lock. The host device comprises a memory configured to store instructions to enable the host device to communicate with the electronic door lock, a processor configured to execute the instructions, a camera positioned to record a user accessing the access point, a low power wireless communication radio, and a high power wireless communication radio. The method further comprises monitoring load resistance between the host device and the electronic door lock, and detecting a change in load resistance between the host device and the electronic door lock. If a change in load resistance is detected, the method comprises capturing a series of still images and/or a video stream via the host device camera, and storing by the host device the series of still images and/or video stream in a data storage device.

In one or more embodiments, the method may further comprise transmitting by the host device the series of still images and/or video stream via a high power radio communication channel to a computing device controlled and operated by a first user, the computing device comprising a memory configured to store instructions to enable the computing device to wirelessly communicate with the electronic door lock and the host device, a processor configured to execute the instructions, a low power wireless communication radio, a high power wireless communication radio, a display and a user interface.

In yet another aspect, the present invention is directed to a method for securing an access point. The method comprises providing an electronic door lock coupled to the access point and providing a host device located at or adjacent to the access point. The host device is in communication with the electronic door lock, and comprises a memory configured to store instructions to enable the host device to communicate with the electronic door lock, a processor configured to execute the instructions, a motion-activated sensor for detecting a user approaching the access point, and a low power wireless communication radio. The method further comprises detecting the user approaching the access point via the host device motion-activated sensor, and if the electronic door lock is in an unlocked state, sending a signal by the host device to the electronic door lock via a low power communication channel to enter a locked state to prevent access to the access point.

In still yet another aspect, the present invention is directed to another method for securing an access point. The method comprises providing an electronic door lock coupled to the access point, and providing a host device located at or adjacent to the access point, the host device being in communication with the electronic door lock. The host device comprises a memory configured to store instructions to enable the host device to communicate with the electronic door lock, a processor configured to execute the instructions, a motion-activated sensor for detecting a user approaching the access point, and a low power wireless communication radio. The method further comprises configuring a no-motion timer on the host device to send a signal by the host device to the electronic door lock via a low power communication channel to enter a locked state when no motion is detected by the host device motion-activated sensor for N consecutive seconds, sending a signal by the host device to the electronic door lock via the low power communication channel to enter an unlocked state, initiating by the host device the no-motion timer, and if the host device motion-activated sensor detects a user approaching the access point prior to the expiration of the host device no-motion timer, resetting the host device no-motion timer.

In still yet another aspect, the present invention is directed to a multi-radio host device located at or adjacent to an access point and in communication with a wirelessly operable electronic door lock coupled to the access point and a remote computing device controlled and operated by a first user. The host device comprises a memory configured to store instructions to enable the host device to communicate with the electronic door lock and the computing device, wherein the computing device comprises a memory configured to store instructions to enable the computing device to wirelessly communicate with the electronic door lock and the host device, a processor configured to execute the instructions, a low power wireless communication radio, a high power wireless communication radio, a display and a user interface. The host device further comprises a processor configured to execute the instructions, a low power wireless communication radio, a high power wireless communication radio, and at least one mechanism for detecting and/or capturing the presence of a second user accessing the access point. The host device and computing device are selectively capable of bidirectional communication via each of a low power radio communication channel and a high power radio communication channel.

The host device may be configured to send event and/or system notifications to the computing device and receive operational and/or configuration commands from the computing device via the low power radio communication channel, and the host device may be further configured to selectively operate the host device high power wireless communication radio to transmit an image and/or video captured by the host device at least one mechanism to the computing device in response to a command from the computing device via the low power radio communication channel.

The host device at least one mechanism may comprise an alphanumeric keypad, a proximity detector, a proximity detector with built-in alphanumeric keypad, a magnetic stripe reader, a magnetic stripe reader with built-in alphanumeric keypad, a biometric reader, a passive infrared sensor, an active infrared sensor, radio signature detection, motion detection, a light sensor, an accelerometer, a vibration sensor, a motion-on camera, a microphone, and a doorbell. The low power radio communication channel may comprise at least one of Bluetooth®, Z-wave® or Zigbee and the high power radio communication channel may comprise at least one of Wi-Fi™, 3G, 4G, or Ethernet. The host device may further comprise a data storage for storing at least one access point valid and/or invalid entry event captured by the host device at least one mechanism. In one or more embodiments, the host device may be battery-operated.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a perspective view of an embodiment of a digital door viewer according to one aspect of the present invention.

FIG. 2 is a front plan view of the door exterior-facing camera of the digital door viewer shown in FIG. 1.

FIG. 3 is a front plan view of the door interior-facing display of the digital door viewer shown in FIG. 1.

DESCRIPTION OF THE EMBODIMENT(S)

Figure 4:
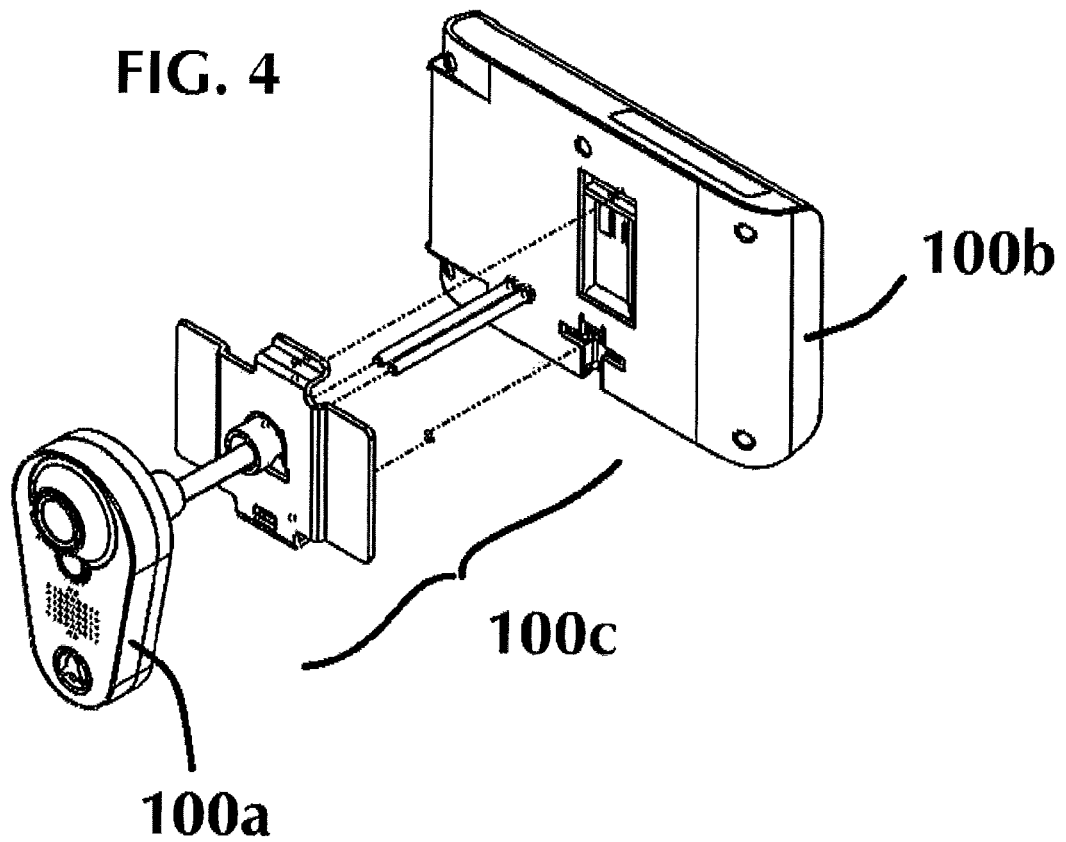
FIG. 4 is an exploded perspective view of an embodiment of a digital door viewer according to one aspect of the present invention.

In describing the embodiments of the present invention, reference will be made herein to FIGS. 1-8 of the drawings in which like numerals refer to like features of the invention.

Certain terminology is used herein for convenience only and is not to be taken as a limitation of the invention. For example, words such as "upper," "lower," "left," "right," "horizontal," "vertical," "upward," and "downward" merely describe the configuration shown in the drawings. For purposes of clarity, the same reference numbers may be used in the drawings to identify similar elements.

Additionally, in the subject description, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion.

The present disclosure relates to systems and methods for selectively utilizing one or both of low power and high power wireless communication radios in a multi-radio host device to manage varying data packet communications in an access control system or other system. In a preferred embodiment, the multi-radio host device low power radio handles all of the small data packet communications, such as event notifications and command/control functions, allowing the system or user to decide if and/or when any event-associated larger data packets (e.g. audio and/or video communications) are to be sent by the high power radio interface. By more efficiently and selectively utilizing the multi-radios, the system provides for increased battery life in the host device and allows for more product feature exposure.

Referring now to FIGS. 1-5, collectively, an embodiment of a multi-radio host device according to one aspect of the present invention is shown. The host device 100 may be a digital door viewer (DDV), similar to that of a residential door peep-hole camera. The DDV comprises a door exterior-facing portion 100A and a door interior-facing portion 100B, with a connecting portion 100C extending through the body of a door 10 which houses internal wiring connections (FIG.

Figure 5:
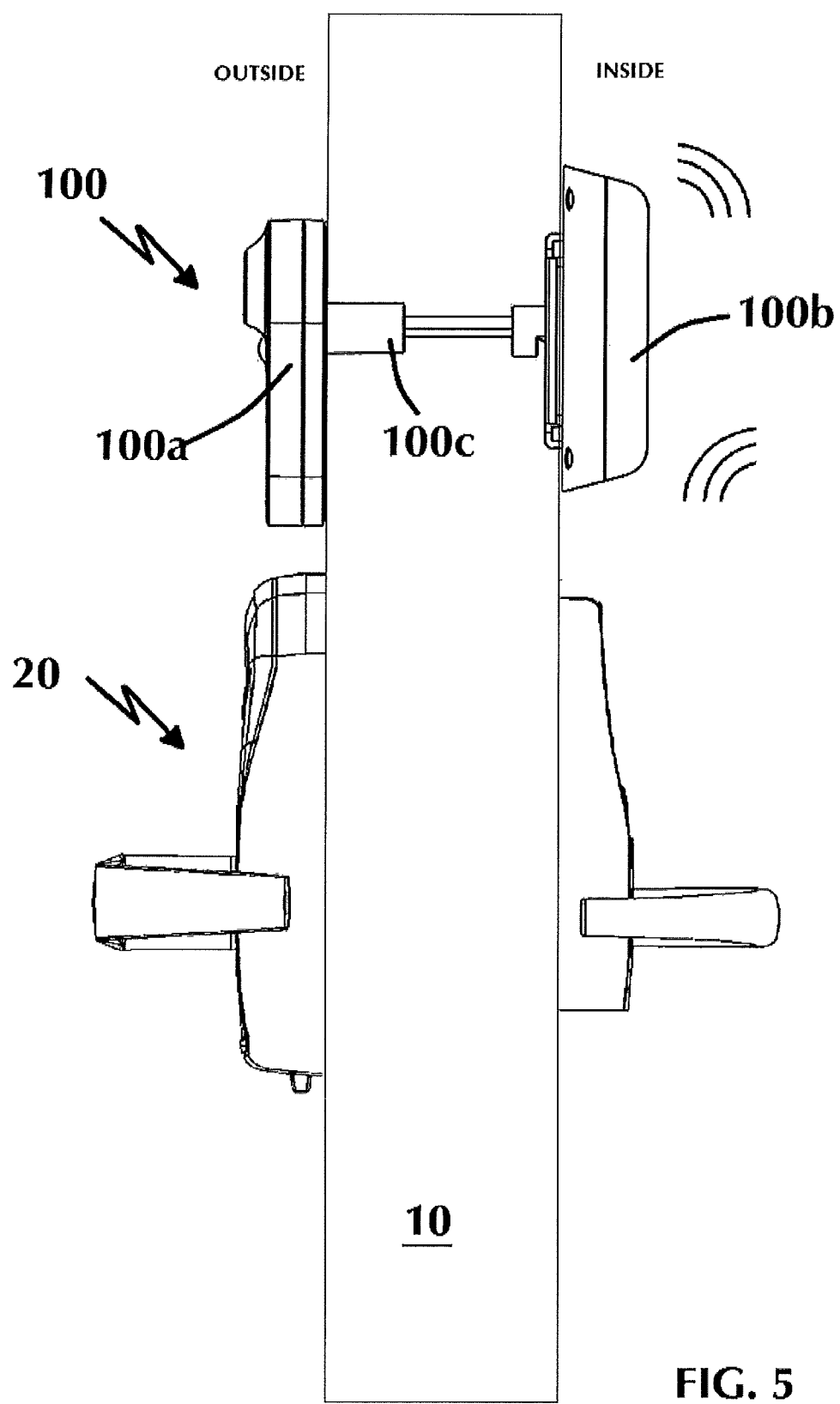
FIG. 5 is a side view of a door including an electronic door lock and a digital door viewer according to one aspect of the present invention.
Figure 7:
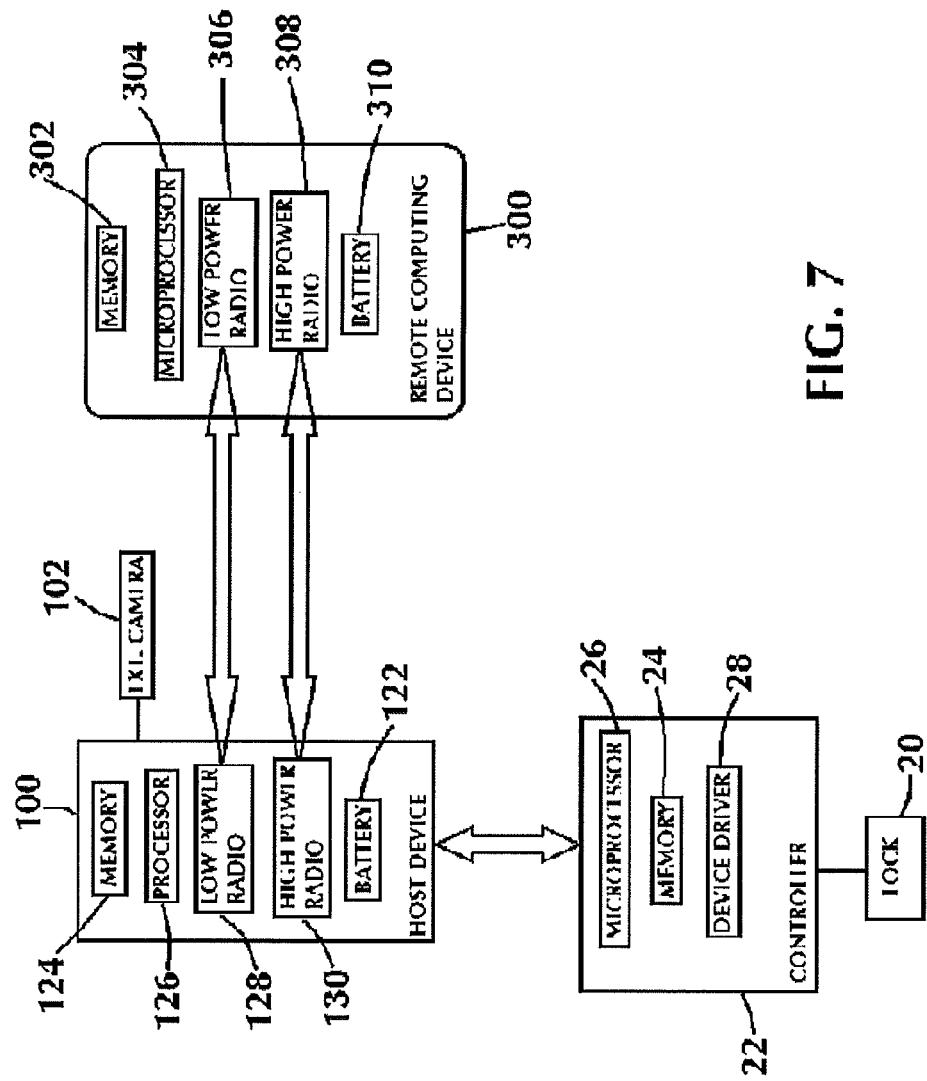
FIG. 7 is a schematic of the electronic door lock, multi-radio host device and remote computing device, according to an embodiment of the present invention.

5). As shown in FIG. 5, the DDV is in electronic communication (wired or wireless) with an otherwise conventional electronic door lock 20 coupled to a door 10, as will be explained in further detail below. Electronic door lock 20 includes a lock controller 22 containing a memory 24 for storing instructions configured for operating the electronic door lock, a microprocessor 26 for executing the instructions, and a device driver 28 for operating the lock between locked and unlocked states (FIG. 7). In an embodiment, the door lock 20 includes an electromechanical system that allows for the movement of a locking mechanism including an actuator, such as a spindle, and a bolt. A thumbturn (not shown) is rotated clockwise or counterclockwise to drive a spindle which will insert or retract the bolt from the door frame. The thumbturn can be actuated remotely using encrypted radio transmissions, which are deciphered by a special purpose onboard circuit. If the code has been deciphered successfully, the circuit will enable a motor which will drive a gearing system which rotates the spindle. This type of door lock is commercially available and represented here for the purpose of illumination and to provide context to those skilled in the art. It should be understood by those skilled in the art that the present invention is not limited to door locks having an internal electromechanical actuating system identical to that described, and that other lock types known in the art may also be used.

In an embodiment, one or more input devices or credential readers (not shown) may be positioned at or adjacent to the electronic door lock for inputting an entry code to unlock the lock. The credential reader may comprise a keypad, a proximity detector, a proximity detector with built-in keypad, a magnetic stripe reader, a magnetic stripe reader with a built-in keypad, or a biometric reader, as well as other types of credential readers such as a smartcard reader, a smartcard reader with built-in keypad, a multitech reader, and a multitech reader with built-in keypad. Each credential reader includes all of the necessary electrical components and firmware required for the credential reader to receive an input credential from a user and output the credential or a signal corresponding to the credential to the control circuit of the door lock 20. For example, a keypad credential reader may be configured to receive a user input (e.g., a numeric or alphanumeric code) and output the entered credential to the control circuit of the door lock 20, whereas a biometric credential reader may be configured to receive a user input (e.g., a fingerprint, a scan of the user's hand, a vocal input, a scan of the user's face, a scan of the user's eye, or other biometric data), process the user input, and output data to the control circuit that is representative of the user input. In some embodiments, the biometric credential reader may receive user input in the form of a fingerprint and output the fingerprint data to the control circuit of the door lock 20. In other embodiments, the biometric credential reader may process the input fingerprint and output a statistical representation of the fingerprint data or some other value representative of the fingerprint or the user that provided the fingerprint.

The control circuit of the door lock 20 includes software or firmware that is operable to receive a variety of credentials or other signals from a variety of different types of credential readers. The software of the control circuit may be configured to recognize the type of credential reader attached to the door lock 20 and thus knows what input to expect from the credential reader. For example, if a keypad is attached, the software expects a user code. If a magnetic stripe reader with a built-in keypad is attached, the software may be configured to expect both a user code and a magnetic stripe input. The software is configured to receive a signal, from each of a plurality of different types of credential readers that corresponds to the credential input by the user.

Referring now to FIG. 2, the multi-radio host device or DDV exterior-facing portion 100A may include a exterior camera 102 for capturing an image and/or video of a user attempting to access the door lock 20, a button 104 which may act as a doorbell function, an exterior speaker 106, a microphone 108, and one or more sensors 110 for detecting the presence of a user approaching the door 10. As shown in FIG. 2, sensor 110 is a passive infrared (PIR) sensor, but may be another type of sensor such as an active infrared sensor, radio signature detection, motion detection, a light sensor, an accelerometer, a vibration sensor, a proximity detector, and the like. Exterior camera 102 may also be a motion-on camera, which acts in a similar manner to the sensors described. Referring now to FIG. 3, the DDV interior-facing portion 100B may include a display 112, such as an LCD touchscreen display, and an interior speaker 114 with built-in microphone. In an embodiment, the LCD touchscreen display 112 may be used to configure the operating parameters of the DDV by the end user, as will be described in more detail below. In one or more embodiments, the DDV may include an on-board or removable data storage 118, such as a secure digital (SD) card slot, for storing images and/or video captured by the exterior-facing camera 102, or for storing valid and/or invalid entry events captured by the DDV or credential reader associated with the door lock 20. Referring again to FIG. 1, battery cover 120 allows access to replace a battery 122 in the DDV.

The DDV is a multi-radio device and includes a high power wireless communication radio 130 (e.g. Wi-Fi™, 3G, 4G, Ethernet) and a low power wireless communication radio 128 (e.g. Bluetooth®, Z-wave®, Zigbee, or the like), which are selectively operable to handle various data packet communications with a remote computing device 300, as will be described in more detail below. References to Bluetooth®, Z-wave®, or Zigbee and Wi-Fi™, 3G, 4G, or Ethernet, respectively, as used herein, are simply exemplary of low power RF or high power RF communication methods which may be employed by the system and methods of the present invention. It should be understood by those skilled in the art that the present invention is not limited to such wireless communication methods and may utilize any methods known in the art that are capable of wirelessly transmitting data packet communications of different sizes.

In an embodiment, the DDV sends all of its system notifications and alarms, and receives any operational or configuration commands, via a low power wireless radio communication. Some of these commands may include instructions to selectively operate its high power radio to send audio and/or video data, as will be described in more detail below. The DDV includes custom firmware which controls its components, e.g. interior display 112, exterior camera 102, sensor(s) 110, optional data storage 118, and communication interfaces. The end user has the ability to configure the DDV in different operating modes including, but not limited to, the operating modes listed in Table 1 below.

TABLE 1

Example operating modes

| Value | Description |
|---|---|
| 00 | No video or image capture on local event (doorbell (DB) or PIR) |
| 01 | Auto image to SD card on PIR |
| 02 | Auto image to SD card on DB |

TABLE 1-continued

Example operating modes

| Value | Description |
|---|---|
| 03 | Auto image to SD card on PIR or DB |
| 04 | Auto Video to SD card on PIR |
| 05 | Auto Video to SD card on DB |
| 06 | Auto Video to SD card on PIR or DB |
| 07 | Auto image to server via WIFI on PIR |
| 08 | Auto image to server via WIFI on DB |
| 09 | Auto image to server via WIFI on PIR or DB |
| 10 | Auto Video to server via WIFI on PIR |
| 11 | Auto Video to server via WIFI on DB |
| 12 | Auto Video to server via WIFI on PIR or DB |

The end user further has the ability to configure the parameters affecting operation of the DDV, including but not limited to, the parameters listed in Table 2 below.

TABLE 2

Example configurable parameters

| Configuration Parameters | Number | Size | Range |
|---|---|---|---|
| IR Enable | 1 | 1 byte | 0x00 = OFF, 0xFF = ON |
| IR Sensitivity | 1 | 1 byte | 0x00 min to 0x0A max. |
| IR delay to capture | 3 | 1 byte | 0x00 to 0x20 seconds |
| IR Reset Time | | 1 byte | 0x00 to 0xFF seconds |
| Doorbell Enable | 2 | 1 byte | 0x00 = OFF, 0xFF = ON |
| Doorbell Delay to Capture | 4 | 1 byte | 0x00 to 0x20 seconds |
| Snapshot Enable | 3 | 1 byte | 0x00 = OFF, 0xFF = ON |
| Alarm Mask | 4 | 2 byte | Bitmap (See Alarm Table) 0 = OFF, 1 = ON |
| Language Select | 5 | 1 byte | 1, 2, 3 |
| Time Format | 6 | 1 byte | 0x00 = 12 hr, 0xFF = 24 hr |
| Auto Video Duration | 7 | 1 byte | 0x00 to 0x20 seconds |
| operating mode | 8 | 1 byte | See table above |
| LCD brightness | 11 | 1 byte | TBD |
| Auto Screen on IR Sense | 12 | 1 byte | 0x00 = OFF, 0xFF = ON |
| Auto Screen on Doorbell button push | 13 | 1 byte | 0x00 = OFF, 0xFF = ON |
| Reset To Factory Defaults | 15 | 1 byte | 01 = Lock will execute Reset To Factory. |
| Audio Enable | 16 | 1 byte | 0x00 = OFF, 0xFF = ON |
| Volume | 17 | 1 byte | 0x00 off to 0x0A full volume |
| Camera mode, resolution, etc . . . | tbd | tbd | tbd |

Figure 6:
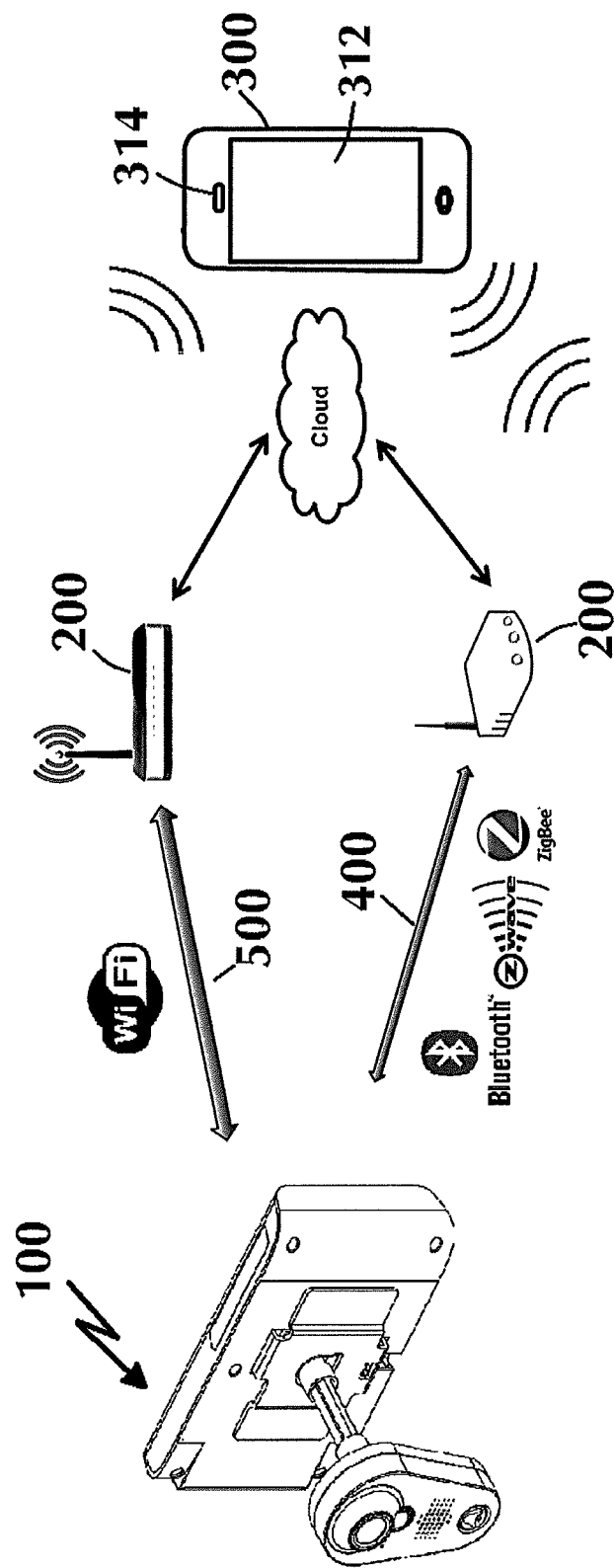
FIG. 6 is a flow diagram showing one embodiment of the system of the present invention.

Digital Door Viewer 100 includes a memory 124 configured to store instructions and a processor 126 configured to execute the instructions, to enable the DDV to communicate with the electronic door lock 20, as well as communicate with a remote computing device 300 controlled and operated by an end user, as part of an integrated access control system for wirelessly managing the access point, as shown in FIGS. 6 and 7. As shown in FIG. 6, the computing device 300 may be a smartphone including a custom firmware or software application for communicating with the DDV and electronic door lock, but may be any other computing device capable of bidirectional communication, such as a desktop computer, laptop computer, a tablet, or other portable electronic device such as a personal digital assistant (PDA). The computing device 300 comprises a memory 302 configured to store instructions to enable it to communicate with the DDV or host device 100, and a processor 304 configured to execute the instructions. The computing device may include a battery 310 (if the device is a portable electronic device, e.g. a smartphone), a low power wireless communication radio 306 and a high power wireless communication radio 308 for communicating with the host device or DDV 100. In an embodiment, the remote computing device includes a display/user interface 312 for communicating with the DDV, and in one or more embodiments, may include a camera 314 for initiating a bidirectional audio/video communication with the DDV over the high power wireless radio communication channel 500 (e.g. Wi-Fi™, 3G, 4G, or Ethernet). The display/user interface 312 may be used to configure the operating parameters of the DDV by the end user.

In at least one embodiment of the present invention, the multi-radio host device or DDV 100 is configured to send a signal via the low power wireless radio communication channel 400 (e.g. Bluetooth®, Z-wave®, Zigbee, or the like) upon any event triggered at the DDV, such as a doorbell or PIR sensor activation. Communication using Bluetooth® wireless technology (v4.0) can be used to send and exchange data over short distances using short-wavelength UHF radio waves in the ISM band from 2.4 to 2.485 GHz between fixed and mobile devices. The effective range varies due to various conditions, but may extend through walls of buildings, and over distances ranging up to 100 m or more. Other communication technologies may be employed, such as ZigBee wireless technology (IEEE 802.15.4) operating at about 915 MHz in the U.S. and Australia, 868 MHz in Europe, 784 MHz in China and 2.4 GHz in other jurisdictions worldwide, or Z-wave® wireless technology operating at about 900 MHz. The low power radio communication from the host device may be received by a Home Gateway or wireless router 200, which in turn notifies a host server, which can make a decision or pass along the event to another device, such as remote computing device 300. Router 200 may be a 802.11 router, 802.16 router, WiFi router, WiMAX router, Bluetooth router, X10 router, or other router.

A resulting response may then be sent by the end user back to the DDV via the low power wireless radio communication channel 400. The response may contain instructions to the DDV, for example, to operate its exterior camera 102 and/or audio system 108 to set up a bidirectional audio and/or video communication with the person detected by the exterior camera, to take a photo snapshot or video of the person detected, to capture an entry event received by a credential reader associated with the electronic door lock, or to power up its Fi™ radio and transmit the image, video, or audio to the end user's computing device 300. As described above, the operating mode of the DDV may be set to auto capture the photo or video on an SD card installed in the DDV device, or to send the photo or video to the end user by selectively operating its high power interface, such as Wi-Fi™. Wi-Fi™ wireless technology (IEEE 802.11) operates at about 2.4 GHz and 5 GHz, and generally requires more power than Bluetooth® and other wireless technologies, e.g. Z-wave®, Zigbee and the like (and thus more rapidly decreases battery life of the host device). In one or more embodiments, the end user may identify the person detected for authorized entry based on the captured image or video, and may send instructions to the electronic door lock via the low power wireless radio communication channel to unlock the lock to provide access thereto, effectively allowing a user to "buzz" a guest into their house. Other modes of operation, such as a queued unlock upon a doorbell press, are not precluded.

By limiting small data packet communications, e.g. event notifications and command/control functions, to the low power wireless radio communication channel, and allowing for selectively operating the high power wireless radio communication channel to transmit large data packet communications, e.g. audio/video, the system of the present invention remedies a deficiency of the prior art, thereby improving the battery life of the host device and more efficiently managing bandwidth while allowing for more product feature exposure.

Another advantage of the system of the present invention is that it may be configured to provide additional layers of security at a given access point. As described above, the host device or DDV 100 may be configured to allow for bidirectional audio/video communication with a person detected by the exterior camera, to take a photo snapshot or video of the person detected, or to capture an entry event received by a credential reader associated with the electronic door lock and, in one or more embodiments, associate the captured entry event with a still image or video stream. By capturing valid and/or invalid entry events, and associating the captured entry event with a still image or video stream captured by the exterior camera, for example, the system allows an end user to confirm who attempted to open the lock or confirm who has unlocked the lock.

In an embodiment, the integrated access control system may also be configured to detect and capture a tampering event at the door lock. The host device or DDV may be connected to an output for at least one electrical component in the lock, wherein the host device is configured to continuously monitor a load resistance between the electronic door lock and the host device. If the DDV detects a change in load resistance, the DDV may be configured to automatically capture a series of still images and/or a video via the exterior camera 102, and store the captured event(s) in a data storage 118. In one or more embodiments, the DDV may be configured to provide a live video stream to the user's remote computing device 300 via the high power wireless communication channel, allowing the end user to determine who is causing or has caused the tamper.

In other embodiments, the integrated access control system may be configured to bypass signaling the remote computing device and instead automatically control the electronic door lock based on the occurrence of one or more designated events. For example, the DDV may be configured to detect a user approaching the access point via a motion-activated sensor, and if the electronic door lock is in an unlocked state, send a signal to the lock controller via a low power communication channel to enter a locked state to prevent access to the access point. Security at the access point would therefore be increased, as the door would always be locked when someone approached the access point. In still other embodiments, a no-motion timer setting on the DDV may be configured to send a signal to the electronic door lock via a low power communication channel to enter a locked state when no motion is detected by the host device motion-activated sensor for N consecutive seconds. After the no-motion timer is initiated, if the motion-activated sensor detects a person approaching the access point prior to the expiration of the host device no-motion timer, the no-motion timer is reset. This mode of operation reduces the inconvenience that a higher security auto re-lock feature may cause users, such as a user unloading groceries or carrying packages between a car and their home through multiple trips back and forth.

In still other embodiments, the end user may configure a profile for Home (decreased layer of security) and Away (increased layer of security) behavior of the DDV. When operating under a Home profile, for example, the DDV may be configured to ignore events captured by a PIR sensor, as the events may be triggered by family members entering and exiting the home and would otherwise result in unnecessary and/or excessive notifications, thus draining the battery of the DDV. Conversely, an Away profile may be configured, for example, to capture every invalid entry event by a credential reader, record video of entry events using the exterior camera, or initiate bidirectional audio/video communication with the end user's computing device upon detection of someone trying to access the lock, thus providing an increased level of security. The DDV may also be configured for a Home Secure profile which is substantially identical to an Away profile, and which may be used during night hours, for example, to provide an increased layer of security.

Figure 8:
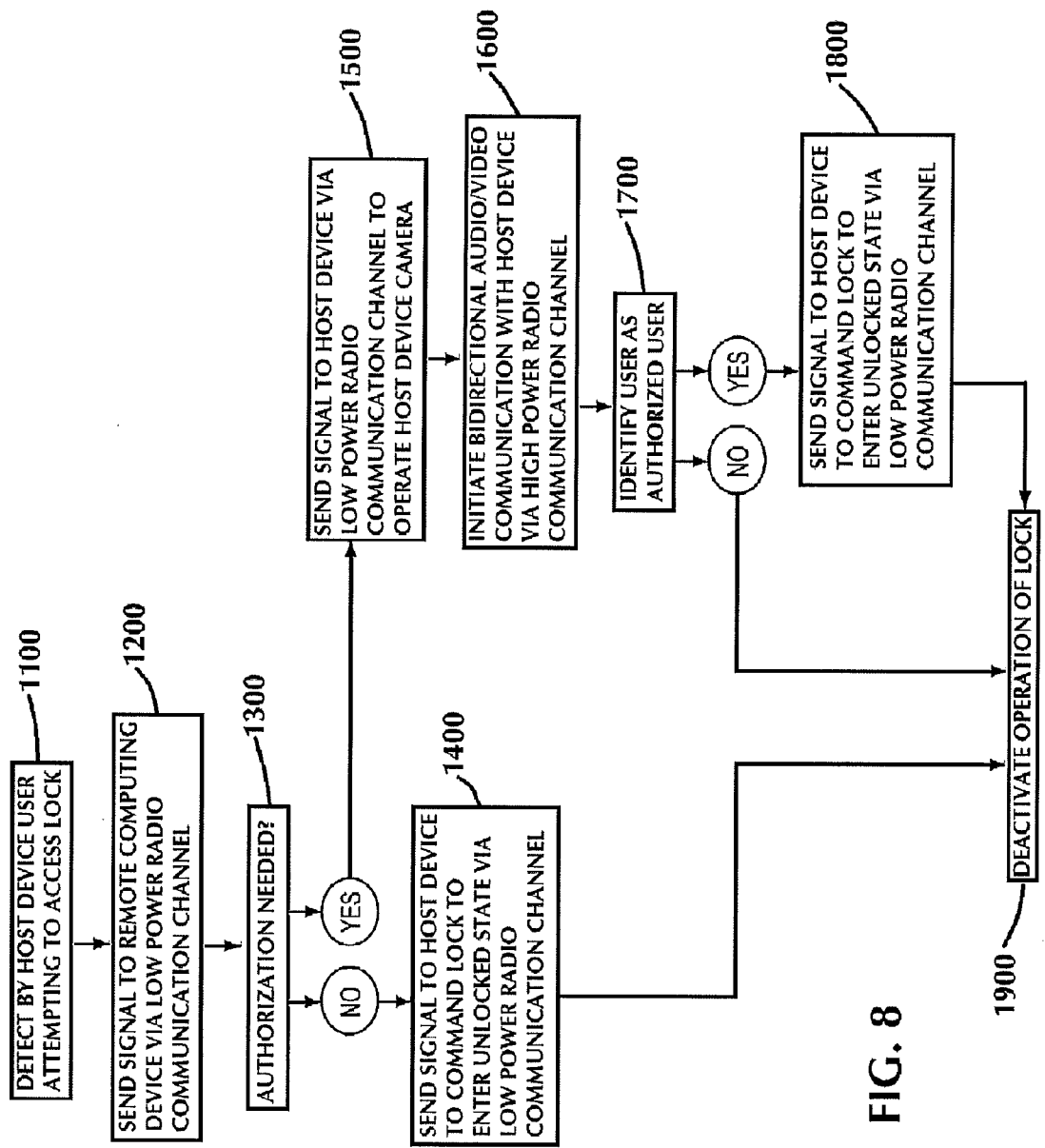
FIG. 8 is a flowchart showing a method of selectively utilizing each of a low power wireless radio communication and a high power wireless radio communication in a multi-radio host device to manage varying data packet communications, according to an aspect of the present invention.

The operation of one embodiment of the integrated access control system of the present invention is depicted in FIG. 8. A visitor attempting to access the electronic door lock is detected by the DDV or host device 100, such as by an exterior camera 102 or passive infrared (PIR) sensor 110, at step 1100. The host device 100 then sends a signal to a remote computing device 300 via the low power wireless radio communication channel indicating detection of a visitor, at step 1200. The system then determines if authorization of the visitor is required, at step 1300. If authorization is not required, such as if the system has been configured for a queued unlock allowing for one-time access to an expected visitor, the host device 100 sends a command signal via the low power wireless radio communication channel to the lock controller 22 to authorize the lock to enter an unlocked state, at step 1400. Alternatively, if authorization of the visitor is required, the remote computing device 300 sends a signal to the host device via the low power wireless radio communication channel with a command request to operate the host device camera, at step 1500. A bidirectional audio/video communication between the host device 100 and remote computing device 300 via the high power wireless radio communication channel is then initiated, at step 1600. If the visitor is not identified as an authorized visitor at step 1700, operation of the lock is deactivated, at step 1900. If the visitor is identified as an authorized visitor, the remote computing device sends a signal to the host device 100 via the low power wireless radio communication channel with a command request to communicate with the lock controller 22 to authorize the lock to enter an unlocked state, at step 1800.

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Thus, the present invention achieves one or more of the following advantages. The present invention provides an integrated access control system for wirelessly managing an access point, wherein the system includes a battery-operated multi-radio host device. By limiting small data packet communications, e.g. event notifications and command/control functions, to the low power wireless radio communication channel, and allowing for selectively operating the high power wireless radio communication channel only to transmit large data packet communications, e.g. audio/video, the system of the present invention remedies deficiencies of the prior art, thereby improving the battery life of the host device and more efficiently managing bandwidth while allowing for more product feature exposure.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An integrated access control system for wirelessly managing an access point, comprising:
 a wirelessly operable electronic door lock coupled to the access point;
 a computing device controlled and operated by a first user, the computing device comprising a memory configured to store instructions to enable the computing device to wirelessly communicate with the electronic door lock and a multi-radio host device located at or adjacent to the access point, a processor configured to execute the instructions, a low power wireless communication radio, a high power wireless communication radio, a display and a user interface;
 a multi-radio host device located at or adjacent to the access point, the host device being in communication with the electronic door lock and the computing device, the host device comprising a memory configured to store instructions to enable the host device to communicate with the electronic door lock and the computing device, a processor configured to execute the instructions, a low power wireless communication radio, a high power wireless communication radio, and at least one mechanism for detecting and/or capturing the presence of a second user accessing the access point,
 wherein the host device and computing device are selectively capable of bidirectional communication via each of a low power radio communication channel and a high power radio communication channel.

2. The system of claim 1 wherein the host device at least one mechanism is selected from the group comprising an alphanumeric keypad, a proximity detector, a proximity detector with built-in alphanumeric keypad, a magnetic stripe reader, a magnetic stripe reader with built-in alphanumeric keypad, a biometric reader, a passive infrared sensor, an active infrared sensor, radio signature detection, motion detection, a light sensor, an accelerometer, a vibration sensor, a motion-on camera, a microphone, and a doorbell.

3. The system of claim 1 wherein the low power radio communication channel comprises at least one of Bluetooth®, Z-wave® or Zigbee and the high power radio communication channel comprises at least one of Wi-Fi™, 3G, 4G, or Ethernet.

4. The system of claim 1 wherein the computing device comprises a desktop computer, a laptop computer, a tablet PC, a cellular telephone or a smartphone.

5. The system of claim 1 wherein the host device is configured to send event and/or system notifications to the computing device and receive operational and/or configuration commands from the computing device via the low power radio communication channel, and the host device is further configured to selectively operate the host device high power wireless communication radio to transmit an image and/or video captured by the host device at least one mechanism to the computing device in response to a command request from the computing device via the low power radio communication channel.

6. The system of claim 1 wherein the host device is configured to send a signal via the low power radio communication channel to the computing device when the host device at least one mechanism detects the presence of a second user accessing the access point.

7. The system of claim 6 wherein the host device is further configured to selectively operate the host device high power wireless communication radio to transmit an image and/or video captured by the host device at least one mechanism to the computing device in response to a command from the computing device via the low power radio communication channel to capture an access point entry event.

8. The system of claim 1 wherein the electronic door lock is moveable between a locked and unlocked position in response to a command signal sent from the host device and received by a lock controller associated with the electronic door lock.

9. The system of claim 1 further comprising a data storage.

10. The system of claim 9 wherein the host device is configured to capture an access point entry event detected by the host device at least one mechanism and store the access point entry event in the data storage.

11. The system of claim 1 wherein the host device further comprises a display and user interface.

12. The system of claim 1 wherein the host device is battery-operated.

13. A method for wirelessly managing an access point, comprising:
provide a wirelessly operable electronic door lock coupled to the access point;
providing a computing device controlled and operated by a first user, the computing device comprising a memory configured to store instructions to enable the computing device to wirelessly communicate with the electronic door lock and a host device located at or adjacent to the access point, a processor configured to execute the instructions, a low power wireless communication radio, a high power wireless communication radio, a display and a user interface;
providing a multi-radio host device located at or adjacent to the access point, the host device being in communication with the electronic door lock and the computing device, the host device comprising a memory configured to store instructions to enable the host device to communicate with the electronic door lock and the first computing device, a processor configured to execute the instructions, a low power wireless communication radio, a high power wireless communication radio, and at least one mechanism for detecting and/or capturing the presence of a second user accessing the access point,
wherein the host device and computing device are selectively capable of bidirectional communication via each of a low power radio communication channel and a high power radio communication channel;
detecting via the host device at least one mechanism the presence of the second user accessing the access point;
signaling by the host device the computing device via the low power radio communication channel;
initiating by the first user from the computing device a bidirectional audio and/or video communication with the host device via the high power radio communication channel;
identifying by the first user the second user for authorized entry at the access point; and
signaling by the computing device the host device via the low power radio communication channel to command the electronic door lock to enter an unlocked state to provide access to the access point to the second user.

14. A method for securing an access point, comprising:
providing an electronic door lock coupled to the access point;
providing a host device located at or adjacent to the access point, the host device being in communication with the electronic door lock, the host device comprising a memory configured to store instructions to enable the host device to communicate with the electronic door lock, a processor configured to execute the instructions, at least one mechanism for detecting a user approaching the access point, and a low power wireless communication radio;
detecting the user approaching the access point via the host device at least one mechanism; and
if the electronic door lock is in an unlocked state, sending a signal by the host device to the electronic door lock via a low power communication channel to enter a locked state to prevent access to the access point.

15. A method for managing an access point entry event, comprising:
providing a wirelessly operable electronic door lock coupled to the access point;
providing a multi-radio host device located at or adjacent to the access point, the host device being in communication with the electronic door lock, the host device comprising a memory configured to store instructions to enable the host device to communicate with the electronic door lock, a processor configured to execute the instructions, a motion-on camera positioned to record a user accessing the access point, a low power wireless communication radio, and a high power wireless communication radio;
providing a credential reader located at or adjacent to the access point for allowing access to the access point to a user, the credential reader being in communication with the electronic door lock and the host device;
detecting via the host device motion-on camera a user activating the credential reader;
capturing via the host device motion-on camera a still image and/or a video of an access point entry event;
associating a date and time of the credential reader activation with the still image and/or video capture; and
storing by the host device the still image and/or video capture in a data storage device.

16. The method of claim 15 wherein the credential reader is selected from the group comprising an alphanumeric keypad, a proximity detector, a proximity detector with built-in alphanumeric keypad, a magnetic stripe reader, a magnetic stripe reader with built-in alphanumeric keypad, and a biometric reader.

17. The method of claim 15 further comprising:
transmitting by the host device the still image and/or video capture via a high power radio communication channel to a computing device controlled and operated by a first user, the computing device comprising a memory configured to store instructions to enable the computing device to wirelessly communicate with the electronic door lock and the host device, a processor configured to execute the instructions, a low power wireless communication radio, a high power wireless communication radio, a display and a user interface.

18. A method for capturing a tampering event at an access point, comprising:
providing an electronic door lock coupled to the access point, the electronic door lock having at least one electrical component in the lock to be monitored and at least one output for connection to a host device located remotely from the electronic door lock for monitoring load resistance between the host device and the electronic door lock;
providing a multi-radio host device located at or adjacent to the access point, the host device being in communication with the electronic door lock, the host device comprising a memory configured to store instructions to enable the host device to communicate with the electronic door lock, a processor configured to execute the instructions, a camera positioned to record a user accessing the access point, a low power wireless communication radio, and a high power wireless communication radio;

monitoring load resistance between the host device and the electronic door lock;
detecting a change in load resistance between the host device and the electronic door lock;
capturing a series of still images and/or a video stream via the host device camera; and
storing by the host device the series of still images and/or video stream capture in a data storage device.

19. The method of claim 18 further comprising:
transmitting by the host device the series of still images and/or video stream via a high power radio communication channel to a computing device controlled and operated by a first user, the computing device comprising a memory configured to store instructions to enable the computing device to wirelessly communicate with the electronic door lock and the host device, a processor configured to execute the instructions, a low power wireless communication radio, a high power wireless communication radio, a display and a user interface.

20. A method for securing an access point, comprising:
providing an electronic door lock coupled to the access point;
providing a host device located at or adjacent to the access point, the host device being in communication with the electronic door lock, the host device comprising a memory configured to store instructions to enable the host device to communicate with the electronic door lock, a processor configured to execute the instructions, a motion-activated sensor for detecting a user approaching the access point, and a low power wireless communication radio;
configuring a no-motion timer on the host device to send a signal by the host device to the electronic door lock via a low power communication channel to enter a locked state when no motion is detected by the host device motion-activated sensor for N consecutive seconds;
sending a signal by the host device to the electronic door lock via the low power communication channel to enter an unlocked state;
initiating by the host device the no-motion timer; and
if the host device motion-activated sensor detects the user approaching the access point prior to the expiration of the host device no-motion timer, resetting the host device no-motion timer.

21. A multi-radio host device located at or adjacent to an access point and in communication with a wirelessly operable electronic door lock coupled to the access point and a remote computing device controlled and operated by a first user, the host device comprising:

a memory configured to store instructions to enable the host device to communicate with the electronic door lock and the computing device, the computing device comprising a memory configured to store instructions to enable the computing device to wirelessly communicate with the electronic door lock and the host device, a processor configured to execute the instructions, a low power wireless communication radio, a high power wireless communication radio, a display and a user interface;
a processor configured to execute the instructions;
a low power wireless communication radio;
a high power wireless communication radio; and
at least one mechanism for detecting and/or capturing the presence of a second user accessing the access point,
wherein the host device and computing device are selectively capable of bidirectional communication via each of a low power radio communication channel and a high power radio communication channel.

22. The host device of claim 21 wherein the host device is configured to send event and/or system notifications to the computing device and receive operational and/or configuration commands from the computing device via the low power radio communication channel, and the host device is further configured to selectively operate the host device high power wireless communication radio to transmit an image and/or video captured by the host device at least one mechanism to the computing device in response to a command request from the computing device via the low power radio communication channel.

23. The host device of claim 21 further comprising a data storage.

24. The host device of claim 21 wherein the host device at least one mechanism is selected from the group comprising an alphanumeric keypad, a proximity detector, a proximity detector with built-in alphanumeric keypad, a magnetic stripe reader, a magnetic stripe reader with built-in alphanumeric keypad, a biometric reader, a passive infrared sensor, an active infrared sensor, radio signature detection, motion detection, a light sensor, an accelerometer, a vibration sensor, a motion-on camera, a microphone, and a doorbell.

25. The host device of claim 21 wherein the low power radio communication channel comprises at least one of Bluetooth®, Z-wave® or Zigbee and the high power radio communication channel comprises at least one of Wi-Fi™, 3G, 4G, or Ethernet.

26. The host device of claim 21 wherein the host device is battery-operated.

* * * * *